United States Patent [19]

Corbett

[11] Patent Number: 4,703,905
[45] Date of Patent: Nov. 3, 1987

[54] MANNED ENTRY VEHICLE SYSTEM

[75] Inventor: Marshall J. Corbett, Northport, N.Y.

[73] Assignee: Grumman Aerospace Corporation, Bethpage, N.Y.

[21] Appl. No.: 772,802

[22] Filed: Sep. 5, 1985

[51] Int. Cl.[4] .............................................. F41F 3/06
[52] U.S. Cl. ..................... 244/162; 244/160; 244/49; 244/135 R; 244/137.1; 89/1.815
[58] Field of Search .................. 244/160, 162, 49, 46, 244/137 R, 135 R; 343/705, 708; 89/1.802, 1.804, 1.815

[56] References Cited

U.S. PATENT DOCUMENTS

| | | | |
|---|---|---|---|
| 1,829,372 | 10/1931 | Rothschild | 244/45 |
| 2,430,793 | 11/1947 | Wells | 244/87 |
| 2,601,962 | 7/1952 | Douglas | 244/42 |
| 2,693,325 | 11/1954 | Lippisch | 244/87 |
| 2,747,816 | 5/1956 | Howard | 244/45 |
| 2,814,454 | 11/1957 | Atkins et al. | 244/102 |
| 2,924,400 | 2/1960 | Ruget | 244/45 |
| 2,997,260 | 8/1961 | Locke, Jr. | 244/45 |
| 3,204,892 | 9/1965 | Powell | 244/49 |
| 3,390,393 | 6/1968 | Upton | 343/708 |
| 3,390,853 | 7/1968 | Wykes | 244/46 |
| 3,478,989 | 11/1969 | Bielefeldt | 244/46 |
| 3,489,375 | 1/1970 | Tracy | 244/46 |
| 3,534,924 | 10/1970 | Spencer, Jr. et al. | 244/49 |
| 3,642,234 | 2/1972 | Kamber et al. | 244/45 |
| 3,883,094 | 5/1975 | Mederer | 244/45 |
| 3,884,435 | 5/1975 | Croy et al. | 244/46 |
| 3,926,389 | 12/1975 | Mederer | 244/45 |
| 4,208,949 | 6/1980 | Bailsen | 244/137 A |

Primary Examiner—Galen Barefoot
Assistant Examiner—Mark R. Valliere
Attorney, Agent, or Firm—Pollock, Vande Sande & Priddy

[57] ABSTRACT

A manned space entry vehicle having pivotally mounted wings which remain stored during space travel and become deployed to a forward-swept configuration after entry in the atmosphere. A radar antenna is mounted in the forward portion of the wing so that it is protected from excessive heat when the wing remains in a stored position during early reentry into the atmosphere. When the wings are deployed, the radar antenna maintains an operative position. The mean aerodynamic center of the deployed wings is transversely aligned with the center of gravity of the vehicle so as to increase the stability of the vehicle. The basic vehicle shape is intended to produce the least reflective radar cross section as it passes over threatening areas in a nose down attitude.

6 Claims, 3 Drawing Figures

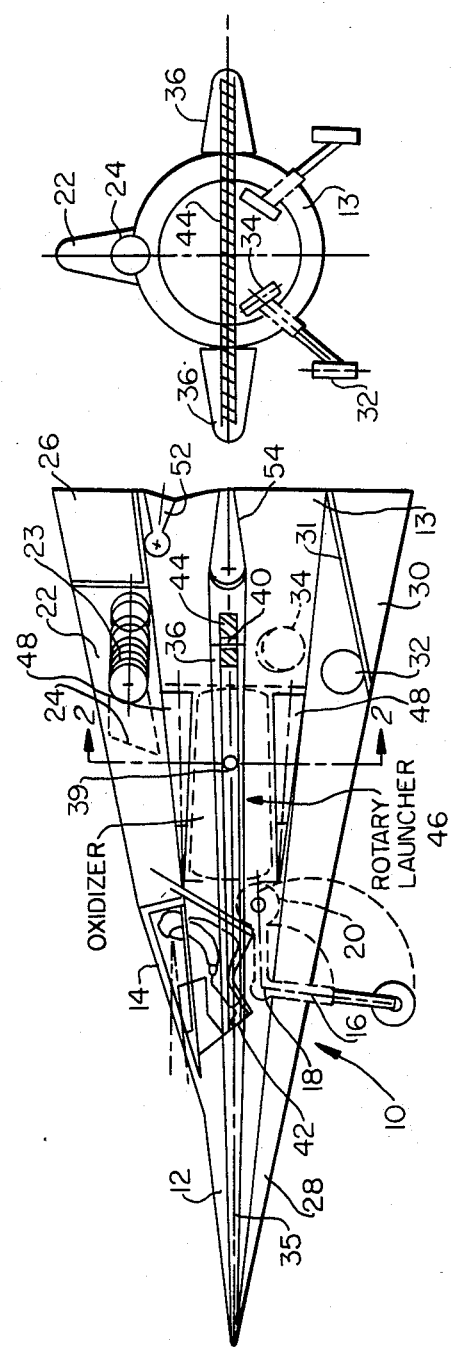

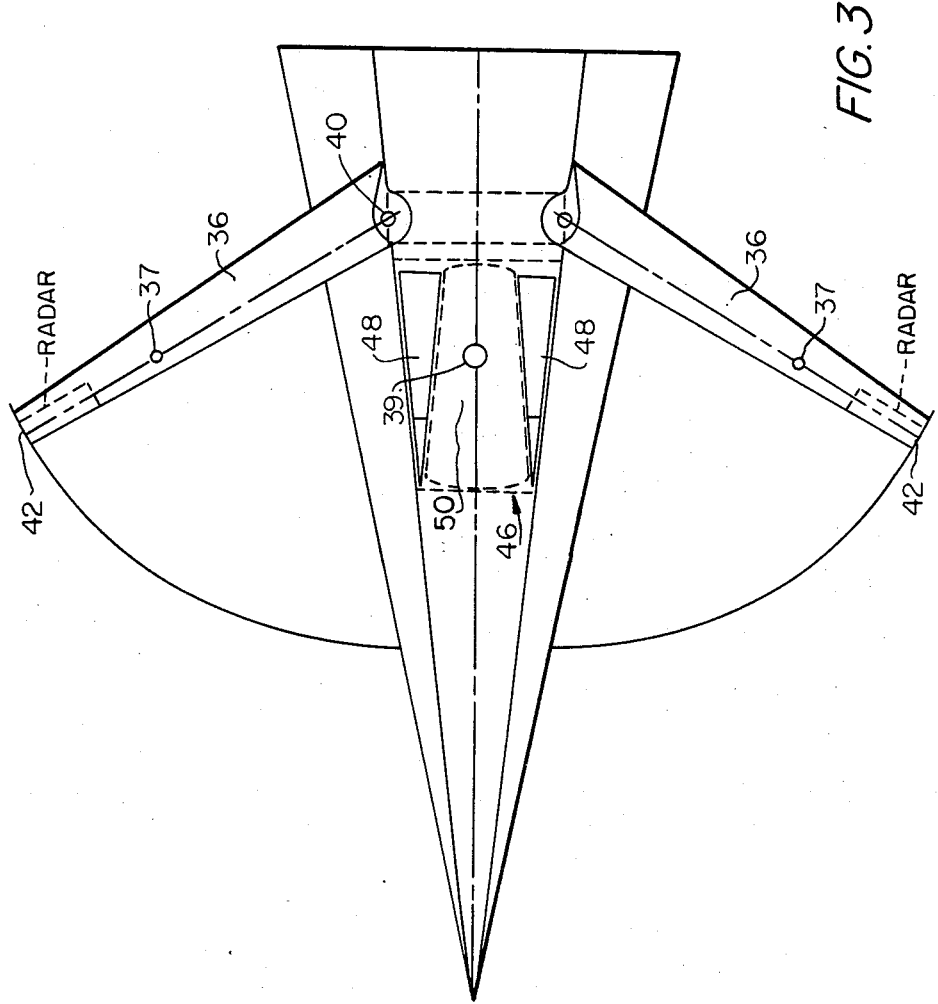

MANNED ENTRY VEHICLE SYSTEM

FIELD OF THE INVENTION

The present invention relates to space vehicles, and more particularly to a manned entry vehicle.

BACKGROUND OF THE INVENTION

In a wide variety of space missions, there is a need for a space craft in the nature of a spaceplane which can take off from land or a space station at any orbital inclination on short notice, for example one hour or less, without the need for dropping boosters toward Earth. Such a spaceplane must also enter into low-Earth orbit and land anywhere within a preselected zone from high-inclination orbits.

A major difficulty in designing such a craft is the requirement for wing structures needed during reentry into the atmosphere in order to obtain stability and steering control. Of course, such structures are disadvantageous for space travel outside the atmosphere due to unnecessary extra weight they add.

In military applications where a manned space craft is employed, radar radomes are often required to be mounted on the craft exterior. This presents major engineering problems inasmuch as the material must withstand extremely high temperatures during reentry.

U.S. Pat. No. 3,534,924, issued Oct. 20, 1970, to Spencer, Jr., et al., discloses a variable geometry manned orbital vehicle in which auxiliary pivotal wings are incorporated to allow retention of an aerodynamically efficient lifting body shape at hypersonic speeds with the auxiliary wings folded into a stored position. At lower speeds the auxiliary wings are deployed at sweep angles which vary as required to provide improvements in lift, lift-drag ratio, and in the stability characteristics of the vehicle.

Although this craft represents an advance over its prior art, it does not provide a solution to the problems of high heat environment for a radar radome. Further, the structure of the Spencer, Jr., et al., patent does not locate the mean aerodynamic center of the auxiliary wing at the same longitudinal location as the center of gravity of the craft. This detracts from the optimum stability characteristics.

BRIEF DESCRIPTION OF THE INVENTION

The present invention is directed to a spaceplane structure which improves upon the prior art. A first advantage presented by the invention is the inclusion of a radar radome on the forward surface portion of an extendable wing so that the radar radome is removed from a high heat generating condition during high velocity conditions of the craft. Upon deployment of the wings when the speed of the craft decreases, the radome is properly positioned for operation in an environment where it will not be subjected to such high temperatures.

A further advantage of the present invention is the location of the mean aerodynamic center of the deployed wing at the same longitudinal location as the center of gravity of the craft, which results in increased stability characteristics for the craft.

The present invention offers a spaceplane with a very narrow elongated cone-delta shape. Thus, the craft exhibits a very low radar cross section when pointed nose down in low-Earth orbit. Accordingly, the spaceplane of the invention may be made difficult to detect when employed in a military capacity.

BRIEF DESCRIPTION OF THE FIGURES

The above-mentioned objects and advantages of the present invention will be more clearly understood when considered in conjunction with the accompanying drawings, in which:

FIG. 1 is a side elevational view of the craft exposing the basic internal components thereof;

FIG. 2 is a simplified cross-sectional view taken along section line 2—2 of FIG. 1;

FIG. 3 is a top plan view of the craft, indicating a deployed wing.

DETAILED DESCRIPTION OF THE INVENTION

Reference numeral 10 generally refers to the manned entry vehicle of the present invention. The fuselage 13 of the vehicle is seen to include a nosecone portion 12 located forwardly of a cockpit 14. A retractable landing gear 16, pivoted at 18, is shown in the deployed position, the retracted position indicated by reference numeral 20. Since the vehicle is intended to operate in space and upon reentry into the atmosphere, an engine must be provided for the latter. In this respect a turbojet engine may be preferably employed and located at 23. Typical types of appropriate turbojets include those manufactured by the General Electric Company. An intake port 24 is formed in the tail section 22 of the vehicle. Movable fins 26 and 54 provide steering capability during maneuvering in the atmosphere and extending from the surface of the fuselage is a fin 28, and a ventral fin 30 located at the lower rear portion of the fuselage, this fin being hingedly mounted to the fuselage at 31 for deployment as necessary. The rear portion of the vehicle includes a retractable main gear 32 which is lowered to a deployed position and raised, as shown at 34, to a stored position. The invention may be modified in a non-illustrated manner to include a bicycle landing gear with out riggers.

A major attribute of the present invention is the inclusion of two pivotally mounted forward-swept wings 36 which are normally positioned in a retracted position in line with the surrounding fuselage. In this position the craft would travel to space. However, upon reentry into the atmosphere, the wings would be deployed as shown in FIGS. 2 and 3 so that the vehicle could be maneuvered and landed upon reentry from space.

As clearly shown in FIG. 3, a radar antenna can be mounted along the forward edge of wing 36 which eliminates the problems of high heat exposure during reentry into the atmosphere from space. This is due to the fact that the radar antenna becomes protected by the fuselage when the wing is in the retracted position. However, after the vehicle enters the atmosphere and deploys its wings, the vehicle will slow down to speeds where such high heat conditions no longer exist. The type of radar which may be employed is the conformal array type which is dealt with in several U.S. patents issued to the present assignee, including U.S. Pat. No. 4,336,543.

A particular advantage of the present invention will be seen from FIG. 3 wherein the location of the mean aerodynamic center 37 of the extended wings 36 is at the same longitudinal location as the center of gravity 39. As most clearly seen in FIG. 2, a beam 44 extends along the length of the wings for structural strength. A pivot 40 (FIG. 1) mounts its corresponding wing 36 in pivotal fashion so that the wing may be deployed from a stored tucked position to a forwardly inclined deployed position, as shown in FIG. 3. FIGS. 1 and 3 indicate the outer edges 42 of the wings 36.

FIGS. 1 and 3 indicate an adaptation of the present invention for military purposes. A rotary launcher, generally indicated by reference numeral 46, can be centrally located within the craft. A number of missiles 48 are mounted in parallel spaced relationship to the axis of the craft; and during a firing condition, the rotary launcher is rotated 360° about the craft axis 35 to enable serial firing of missiles 48 through ports (not shown) formed in the skin of the craft.

The illustrated version may be modified to serve as a reconnaissance vehicle, with the rotary launcher 46 removed thereby creating sufficient room for a second person to operate reconnaissance equipment.

With continued reference to FIG. 3, propellant oxydizer, such as $N_2O_4$ would be stored within a reservoir 50 which is located internally of the rotary launcher 46, the rotary launcher and reservoir being concentric with the center of gravity 39. By having the mean aerodynamic center 37 of the wing colinear with the center of gravity and the center of the launcher-reservoir, the vehicle is capable of exhibiting high stability and maneuverability. A rocket nozzle such as 52 (FIG. 1) is included in the vehicle for maneuvering the space.

In a preferred method of operational launch for a vehicle as described herein, a solid rocket booster may be employed with a 45° inclination. Such a launch method is conventional and is used in connection with the U.S. Space Shuttle program. When launched, the vehicle may be equipped with "drop tanks" (not shown) which may be required to effect second stage burn after launching.

Thus, by virtue of the invention as previously explained, a two-position (stored and deployed) forward-swept wing vehicle with improved handling characteristics becomes realizable. The stored wings are deployed at subsonic speed, for example 300 knots at 30,000 feet, to provide landing qualities to a space vehicle which would not be possible with prior art structures.

Further, by virtue of the location of the radar on the forward portion of the wing, the radar radome need not be specially engineered for high heat conditions inasmuch as the radar is protected from such conditions when the wing is stored.

Last but not least, the location of the mean aerodynamic center of the extended wing at the same longitudinal location as the center of gravity increases the stability of the aircraft, particularly when outfitted with a rotary missile launcher which, as previously outlined, is concentric with the vehicle center of gravity.

The very narrow nosecone illustrated in the figures will most likely ablate during reentry due to the high heating rates concentrated in the small area of the nosecone, much like a ballistic missile reentry nosecone. It is anticipated that the present invention will be equipped with an easily removable and replaceable nosecone which may be installed upon landing.

It should be understood that the invention is not limited to the exact details of construction shown and described herein for obvious modifications will occur to persons skilled in the art.

I claim:

1. A manned entry vehicle comprising:

a fuselage having a center of gravity located therein;

a plurality of wings, each pivotally mounted at a rear end thereof to the fuselage so that the wing can maintain a forward-swept orientation upon deployment, each deployed wing having a mean aerodynamic center transversely aligned with the center of gravity of the vehicle for increasing the stability of the vehicle;

a rotary weapon launcher included within the fuselage of the vehicle, the launcher having a center coincident with the center of gravity of the vehicle; and a fuel reservoir located in the center of the launcher and having a center coincident with the center of gravity of the vehicle.

2. A manned entry vehicle comprising:

a fuselage having a center of gravity located therein;

a plurality of wings, each pivotally mounted at a rear end thereof with the fuselage so that the wing can maintain a forward-swept orientation upon deployment, each wing having a mean aerodynamic center transversely aligned with the center of gravity of the vehicle for increasing the stability of the vehicle;

radar means mounted within a forward portion of at least one wing so that the radar is protected from excessive heat when the wing is in a retracted position;

a rotary weapon launcher included within the fuselage of the vehicle, the launcher having a center coincident with the center of gravity of the vehicle; and a fuel reservoir located in the center of the launcher and having a center coincident with the center of gravity of the vehicle.

3. The structure of set forth in claim 2 together with retractable landing gears normally stored within the fuselage of the vehicle.

4. The structure set forth in claim 3 together with a ventral fin mounted to the fuselage which is movable to a non-interferring position with the landing gear when the latter is deployed.

5. The structure set forth in claim 4 together with a cockpit located at a forward section of the vehicle for accommodating a pilot.

6. The structure set forth in claim 5 together with turbojet means located on the vehicle for powering it during travel in the atmosphere.

* * * * *

UNITED STATES PATENT AND TRADEMARK OFFICE
CERTIFICATE OF CORRECTION

PATENT NO. : 4,703,905

DATED : November 3, 1987

INVENTOR(S) : Marshall J. Corbett

It is certified that error appears in the above-identified patent and that said Letters Patent is hereby corrected as shown below:

Column 3, line 28, change "the" (second occurrence) to --in--.

Column 4, line 46, delete "of".

Column 4, line 51, change "non-interferring" to --non-interfering--.

Signed and Sealed this

Nineteenth Day of April, 1988

Attest:

DONALD J. QUIGG

Attesting Officer

Commissioner of Patents and Trademarks